United States Patent [19]

Bovee

[11] Patent Number: 5,072,247
[45] Date of Patent: Dec. 10, 1991

[54] INFRARED REMOTE CONTROL DEVICE

[76] Inventor: John A. Bovee, 6012 Pickbourne, Union Lake, Mich. 48085

[21] Appl. No.: 549,902

[22] Filed: Jul. 9, 1990

[51] Int. Cl.$^5$ ............................................... G03B 17/38
[52] U.S. Cl. .................................................... 354/266
[58] Field of Search ................ 354/266, 131; 455/603, 455/617, 619; 340/825.69, 825.65

[56] References Cited

U.S. PATENT DOCUMENTS

| | | | |
|---|---|---|---|
| 3,922,691 | 11/1975 | Matsumoto | 354/459 |
| 3,961,342 | 6/1976 | Maida | 354/412 |
| 4,024,502 | 5/1977 | Eberwein et al. | 455/603 |
| 4,036,762 | 7/1977 | Troetscher et al. | 354/266 |
| 4,290,685 | 9/1981 | Ban | 354/266 |
| 4,368,966 | 1/1983 | Hagynda | 354/416 |
| 4,433,903 | 2/1984 | Afdasta | 354/266 |
| 4,446,335 | 5/1984 | Lee et al. | 379/394 |
| 4,707,127 | 11/1987 | Goedken | 354/266 |
| 4,801,959 | 1/1989 | Chern | 354/266 |
| 4,937,604 | 6/1990 | Yoshida et al. | 354/266 |

Primary Examiner—L. T. Hix
Assistant Examiner—Howard B. Blankenship
Attorney, Agent, or Firm—Gifford, Groh, Sprinkle, Patmore and Anderson

[57] ABSTRACT

A device is provided for remotely controlling an electrically activated unit, such as a camera or appliance receptacle, by utilizing a conventional infrared transmitter. The device includes an infrared detector for detecting an infrared signal pulse from the conventional transmitter and which produces an electrical output pulse signal for each detected infrared pulse. A counter counts the output signal pulses from the infrared detector while a timer periodically resets the counter to zero. Whenever the count in the counter exceeds a predetermined number before being reset by the timer, an output signal is generated which activates the remote unit. The counter and the timer thus prevent unintended activation of the remote unit by ambient infrared radiation.

9 Claims, 3 Drawing Sheets

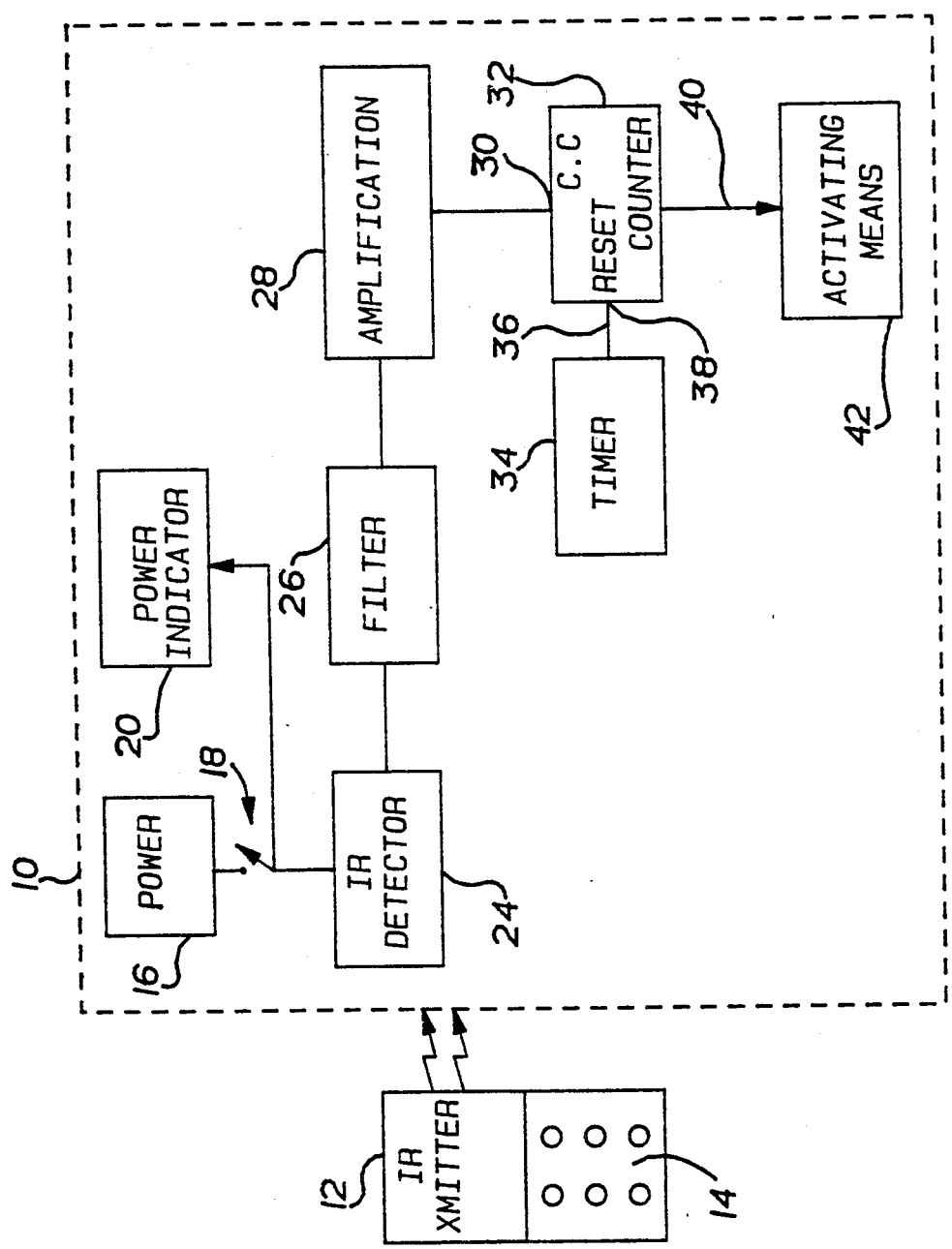

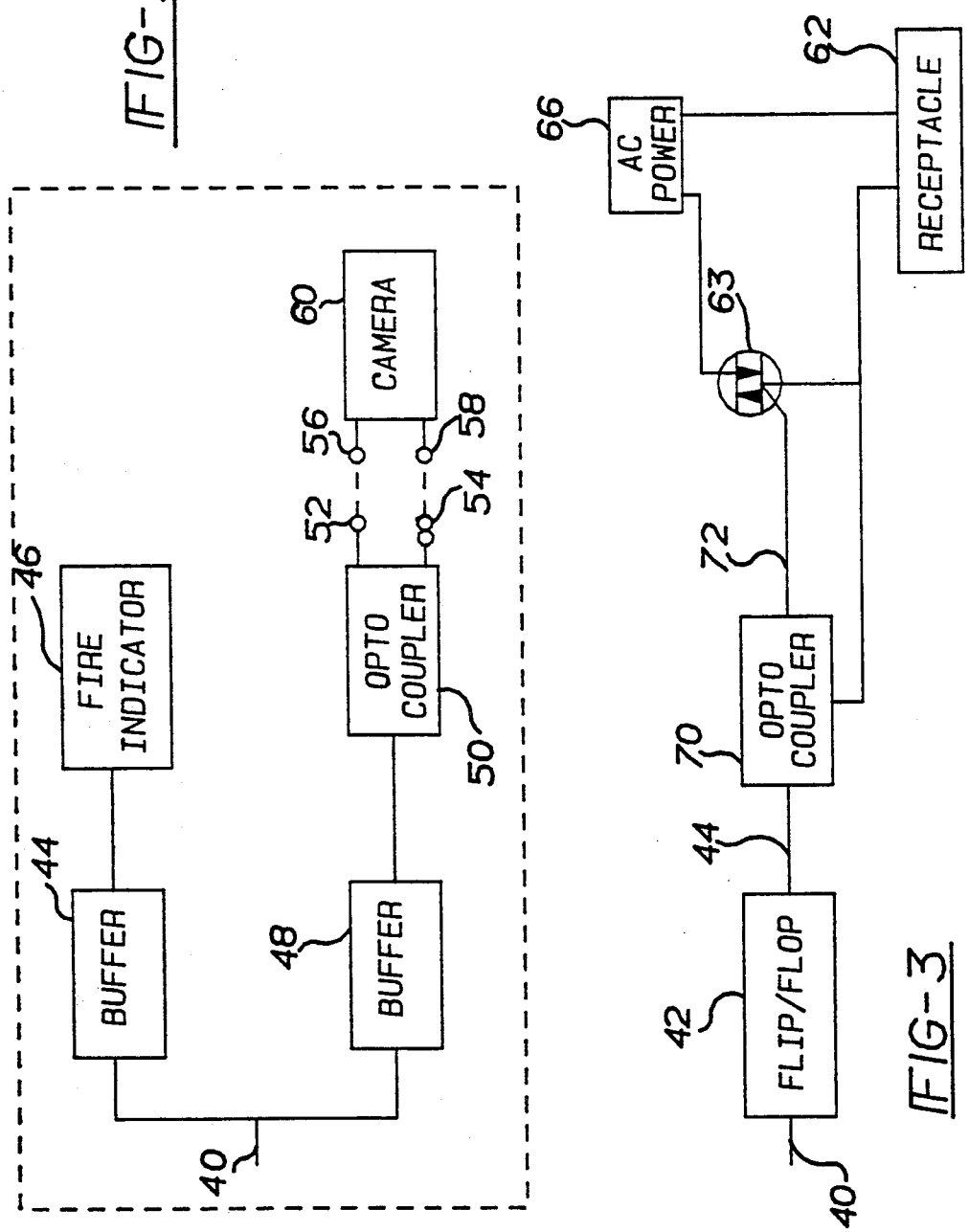

INFRARED REMOTE CONTROL DEVICE

BACKGROUND OF THE INVENTION

I. Field of the Invention

The present invention relates generally to remote control devices and, more particularly, to an infrared remote control device.

II. Description of the Prior Art

Many modern cameras include an electrically activated shutter and motor driven film advance. Typically, these cameras include two electrical terminals or jacks in which completion of the electrical circuit between the terminal both activates the shutter to take the picture, as well as advances the film to the next frame.

In many situations, it is desirable to activate a camera from a remote location For example, in wildlife photography it is frequently desirable to establish the camera location and then activate the camera from a remote position. In doing so, the photographer can avoid disturbing the wildlife while still obtaining the desired photographs.

There have been a number of previously known cameras which are activated by remote controls. Some of these remote control cameras utilize a hard wire system while others utilize a radio link. In at least one previously known remote control device for a camera, an infrared signal is used as the communication link to activate the camera from a remote position.

One disadvantage of these previously known cameras with remote control units is that they are very expensive in cost. The reason for this high cost for the remote control units, particularly with infrared remote control units, is twofold.

First, the previously known cameras with infrared remote control units include both the infrared transmitter which is operated by the photographer at the remote position as well as the infrared receiver at the camera. Consequently, these previously known devices have required the purchase of both the receiver and the transmitter.

Secondly, it has been necessary for the infrared receiver of the camera to differentiate between the infrared signal from the transmitter and ambient infrared signals which may be present in the atmosphere. Typically, the transmitter transmits a coded sequence of pulses to the receiver. The receiver in turn, upon receipt of the infrared signal, decodes the series of pulses and then utilizes circuitry to determine whether the received infrared signal constitutes a valid signal from the transmitter or is merely ambient infrared radiation. In either case, both the coding of the infrared signal at the transmitter, as well as the decoding of the infrared signal at the receiver, increases the overall cost of the remote control device.

SUMMARY OF THE PRESENT INVENTION

The present invention provides a device which overcomes the above mentioned disadvantages of the previously known devices.

In brief, the present invention provides an infrared receiver having means for detecting an infrared signal pulse and for producing an output signal pulse representative thereof. The output from the infrared detector is coupled as an input clock signal to a counter which counts the number of pulses detected by the infrared detector.

A timer periodically resets the counter at a predetermined rate, preferably between 0.5 and 2.0 seconds.

Means are then responsive to the count in the counter so that whenever the count in the counter exceeds a predetermined count, such as 64, the means generates an activation signal to the remote control unit. In one embodiment of the invention, the remote control unit is a motor driven camera. In a second embodiment of the invention, the remote control unit is an electrical receptacle used with conventional AC line current. Any desired electrical device, such as a light, can be plugged into the receptacle.

A conventional infrared transmitter of the type used to activate electronic equipment is then used to activate the remote control unit. Such electronic infrared transmitters typically continuously transmit a series of coded infrared pulses upon activation while the sequence or code of the pulses varies depending upon which key is depressed at the infrared transmitter. The infrared receiver, however, does not discriminate between the code of the infrared pulses from the transmitter, but rather merely counts the number of pulses within a given time period. Although stray or ambient radiation may increment the counter during any time period, it is highly improbable that ambient infrared radiation will increment the count in the counter greater than the predetermined count during any time period thereby effectively eliminating unintended activation of the remote unit through ambient infrared radiation.

Consequently, the present invention provides a low cost remote control device both by using a conventional and frequently available infrared remote control unit and also by utilizing a simple timer and counter scheme to differentiate between the infrared transmitter and ambient infrared radiation.

BRIEF DESCRIPTION OF THE DRAWINGS

A better understanding of the present invention will be had upon reference to the following detailed description when read in conjunction with the accompanying drawings, wherein like reference characters refer to like parts throughout/the several views, and in which:

FIG. 1 is a block diagrammatic view illustrating a preferred embodiment of the present invention;

FIG. 2 is a block diagrammatic view illustrating a portion of a preferred embodiment of the present invention;

FIG. 3 is a block diagrammatic view illustrating a portion of a second preferred embodiment of the present invention;

DETAILED DESCRIPTION OF PREFERRED EMBODIMENTS OF THE PRESENT INVENTION

With reference first to FIG. 1, a block diagrammatic view of the remote control device 10 of the present invention is thereshown for use in conjunction with a conventional infrared transmitter 12. The infrared transmitter 12 may be of any conventional design and is typically used for controlling electronic equipment, such as televisions, stereo equipment and the like. The infrared transmitter 12 typically includes a plurality of buttons 14. Upon depression of any of the buttons 14, the infrared transmitter generates a series of infrared pulses.

Figure 4:
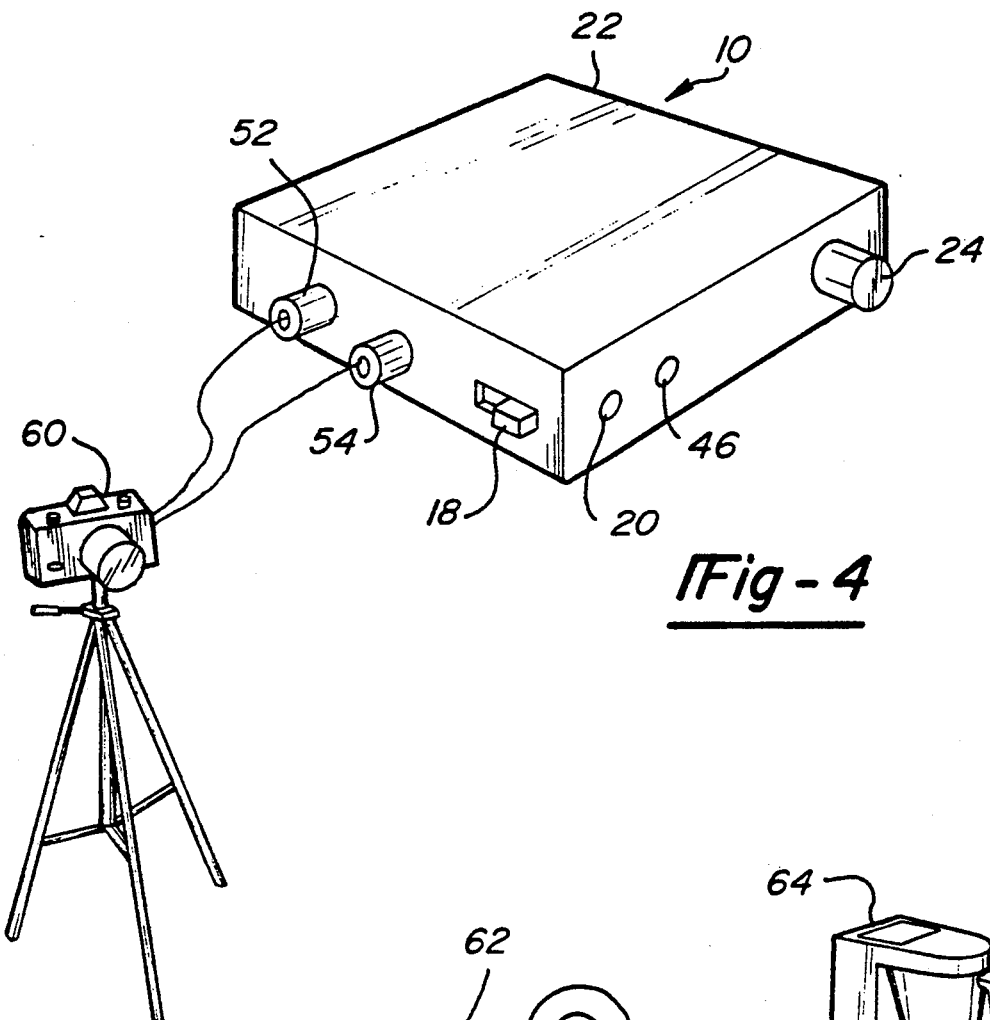
FIG. 4 is a perspective view illustrating the first preferred embodiment of the invention.

As best shown in FIGS. 1 and 4, the device 10 includes a power supply 16, such as a battery, which is used to electrically power the device 10. A switch 18 is used to electrically connect electrical power to the device 10 when units closed position. When open, the switch 18 conserves the battery power 16. Furthermore, a light indicator 20 is preferably illuminated whenever the switch 18 is closed to indicate that the device 10 is ready for use.

The circuitry for the device 10 is contained within a housing 22 (FIG. 4) while an infrared detector 24 is open to one side of the housing 22 and detects incoming infrared pulses from the transmitter 12. For each pulse detected by the detector 24, the infrared detector 24 generates an output pulse through a filter 26 and amplifier 28 to the clock input 30 of a digital counter 32. In the well known fashion, the counter 32 counts the incoming pulses on its clock input 30 which are representative of the number of pulses received by the detector 24.

With reference now particularly to FIG. 1, a timer 34 periodically generates an output signal on its output 36 to the reset input 38 of the counter 32. Preferably, the timer 34 generates an output on its line 36 to reset the counter 32 at a rate of between 0.5 and 2.0 seconds. Any conventional means, such as a 555 timer, can be used as the timer 34.

Still referring to FIG. 1, whenever the count in the counter 32 exceeds a predetermined count during a single period as controlled by the timer 34, the counter 32 generates an output signal on its output line 40 to an activating means 42. In the preferred embodiment of the invention, the predetermined count is greater than 10 and preferably 64 before the counter 32 generates an output signal on its line 40 to the activating means 42.

With reference now to FIG. 2, one embodiment of the activating means 42 is thereshown in which the signal from line 40 is connected through a first buffer 44 to a visual indicator 46 mounted on the housing 22 (FIG. 4) to provide a visual signal to the operator that an activation has occurred.

The signal on line 40 from the counter 32 is also coupled through a second buffer 48 to activate an optocoupler 50. As best shown in FIGS. 2 and 4, the optocoupler 50 has two terminals 52 and 54 which are connected to cooperating jacks 56 and 58 of a motor driven camera 60. As is well known, momentary closure or electrical connection of the camera jacks 56 and 58 activates the camera 60 to both take the photograph and thereafter advance the film to the next frame.

Other devices, such as an electronic switch, can be used in lieu of the optocoupler 50.

In operation, the jacks 52 and 54 of the device 10 are electrically connected to the camera 60 and a switch 18 is switched to its on or closed position. The photographer then takes the infrared transmitter 12 to a position remote from the camera 60.

Thereafter, when the photographer desires to take a picture, the photographer holds down any of the buttons 14 on the infrared transmitter 12. In doing so, the infrared transmitter 12 sends forth a series of pulses to the infrared detector 24. The infrared detector 24, through the filter 26 and amplifier 28 then provides a series of pulses 30 to the counter 32 so that the counter 32 is incremented one count for each pulse from the infrared transmitter 12. Furthermore, any coding employed by the infrared transmitter 12 is simply ignored; instead, the counter 32 merely counts the number of pulses of infrared radiation received by the detector 24.

The timer 34 continually resets the counter 32 once for each time period, i.e. the timer 34 resets the counter 32 once every 0.5-2.0 seconds. Consequently, any stray or ambient infrared radiation will be insufficient to generate a sufficient count on the counter 32 to generate its output signal on line 40 to the activating means 42. Conversely, receipt of a signal from the infrared transmitter 12 produces a rapid series of infrared pulses so that the count in the counter 32 reaches the predetermined count during a single time period therefore producing an output signal on line 40. This in turn activates the camera as has been previously described.

Figure 5:
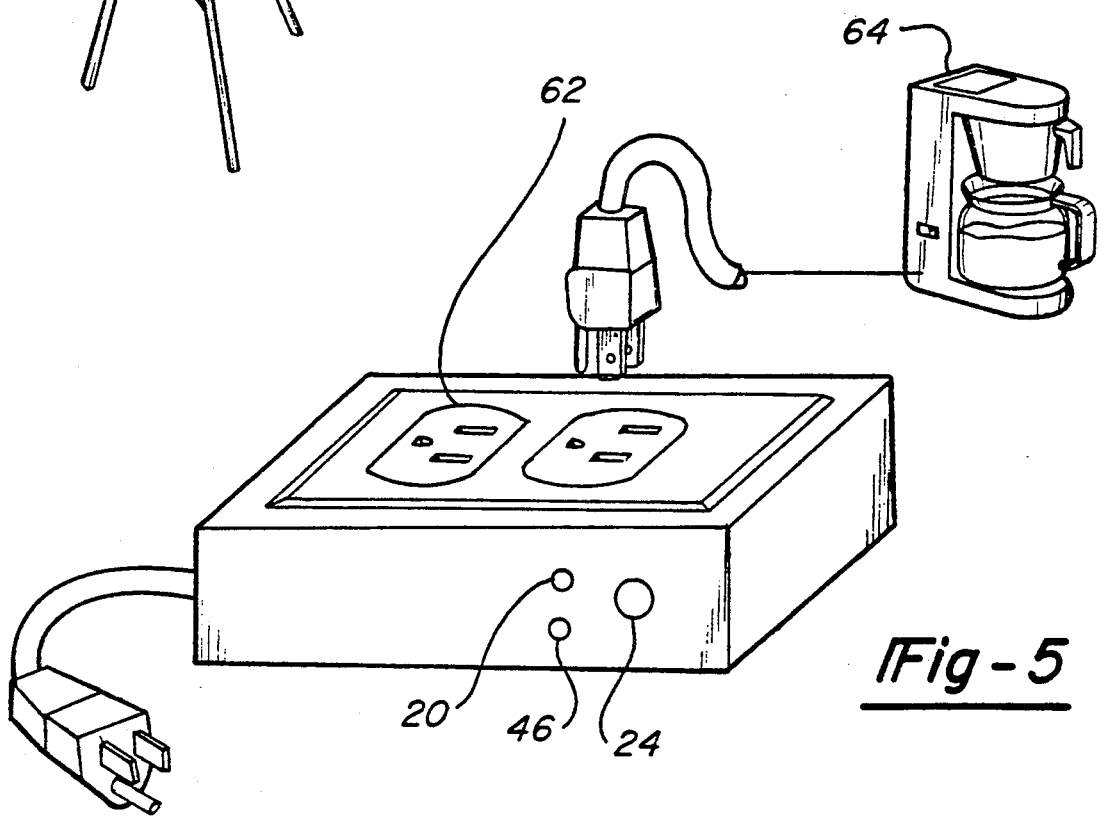
FIG. 5 is a perspective similar to FIG. 4 but illustrating the second preferred embodiment of the present invention.

With reference now to FIGS. 3 and 5, an alternative form of the invention is thereshown in which the remote unit constitutes an electrical receptacle 62 adapted to receive a conventional electrical appliance 64, such as a light. In this embodiment of the invention, a triac 63 (FIG. 3) has its main terminal 1 and main terminal 2 wired in series between the power line of an alternating current source 66 and the receptacle 62.

As best shown in FIG. 3, the output line 40 from the counter 32 is connected as an input signal to a flip flop 42 having an output 44 which changes its state each time an input pulse is received on line 40. The output 44 from the flip flop 42 is connected as an input signal to an optocoupler 70 having its output 72 connected to the gate of T the triac 63.

In operation, once the counter 32 generates an output signal on its output 40 to the flip flop 42 in the previously described fashion, the output 44 from the flip flop 42 changes state. In doing so, the flip flop 42 activates the optocoupler 70 which turns on the triac 63 through its gate. When a subsequent signal is received by the flip flop 42 on line 40, the output 44 from the flip flop 42 again changes state thus shutting off the optocoupler and the triac 63. Once the triac 63 is turned off, the AC power source 66 is electrically disconnected from the receptacle 62.

The second preferred embodiment of the present invention shown in FIGS. 3 and 5 also preferably uses an AC to DC power source in lieu of the battery. Any conventional power supply can be used.

From the foregoing, it can be seen that the present invention provides a simple, inexpensive and yet effective device for remotely controlling an electrically activated unit, such as a camera or an appliance from a conventional infrared transmitter. Furthermore, by utilizing the simple counter 32 with its periodic resetting timer 34, the device of the present invention is capable of discriminating between ambient infrared signal and the infrared signal from the transmitter 12 without the previously required circuitry for decoding the infrared pulse used by other infrared remote control devices.

Having described my invention, however, many modifications thereto will become apparent to those skilled in the art to which it pertains without deviation from the spirit of the invention as defined by the scope of the appended claims.

I claim:

1. For use in conjunction with a conventional infrared transmitter which generates a series of pulses upon actuation, a device for remotely controlling an electrically activated unit comprising:

means for detecting an infrared signal pulse and for producing a single output signal pulse in response to each infrared signal pulse detected by said detecting means, means for counting each said output signal pulse from said detecting means, means for continuously periodically generating a series of reset signals, said generating means generating one reset signal during a preset time interval so that the time duration between successive reset signals remains constant, means responsive to each reset signal for resetting said counting means to a preset number, means responsive to a count in the counter greater than a predetermined count for generating an activation signal, and means responsive to said activation signal for activating the electrically activated unit.

2. The invention as defined in claim 1 wherein said remote unit comprises a camera having an electrically actuated shutter and advance mechanism.

3. The invention as defined in claim 2 wherein said activating means comprises an optocoupler.

4. The invention as defined in claim 2 and comprising means at said remote unit for visually indicating activation of said remote unit.

5. The invention as defined in claim 2 wherein said predetermined count exceeds said preset number by at least ten so that at least ten output signal pulses must be produced by said detector means during a single reset period for said generation means to generate said activation signal.

6. The invention as defined in claim 5 wherein said preset number exceeds said predetermined count by at least fifty.

7. The invention as defined in claim 5 wherein 1 said reset signal generating means generates a reset signal once every 0.5-2.0 seconds.

8. The invention as defined in claim 1 wherein the electrically activated unit comprises an electrical appliance receptacle.

9. The invention as defined in claim 8 wherein said activating means comprises a flip flop, an output and a triac controlled by the state of said flip flop output, said triac having its main terminal 1 and main terminal 2 wired in series with the receptacle.

* * * * *